Aug. 12, 1969    F. KRUMBEIN    3,460,730
FILM ADVANCING DEVICE
Filed June 13, 1967    2 Sheets-Sheet 1

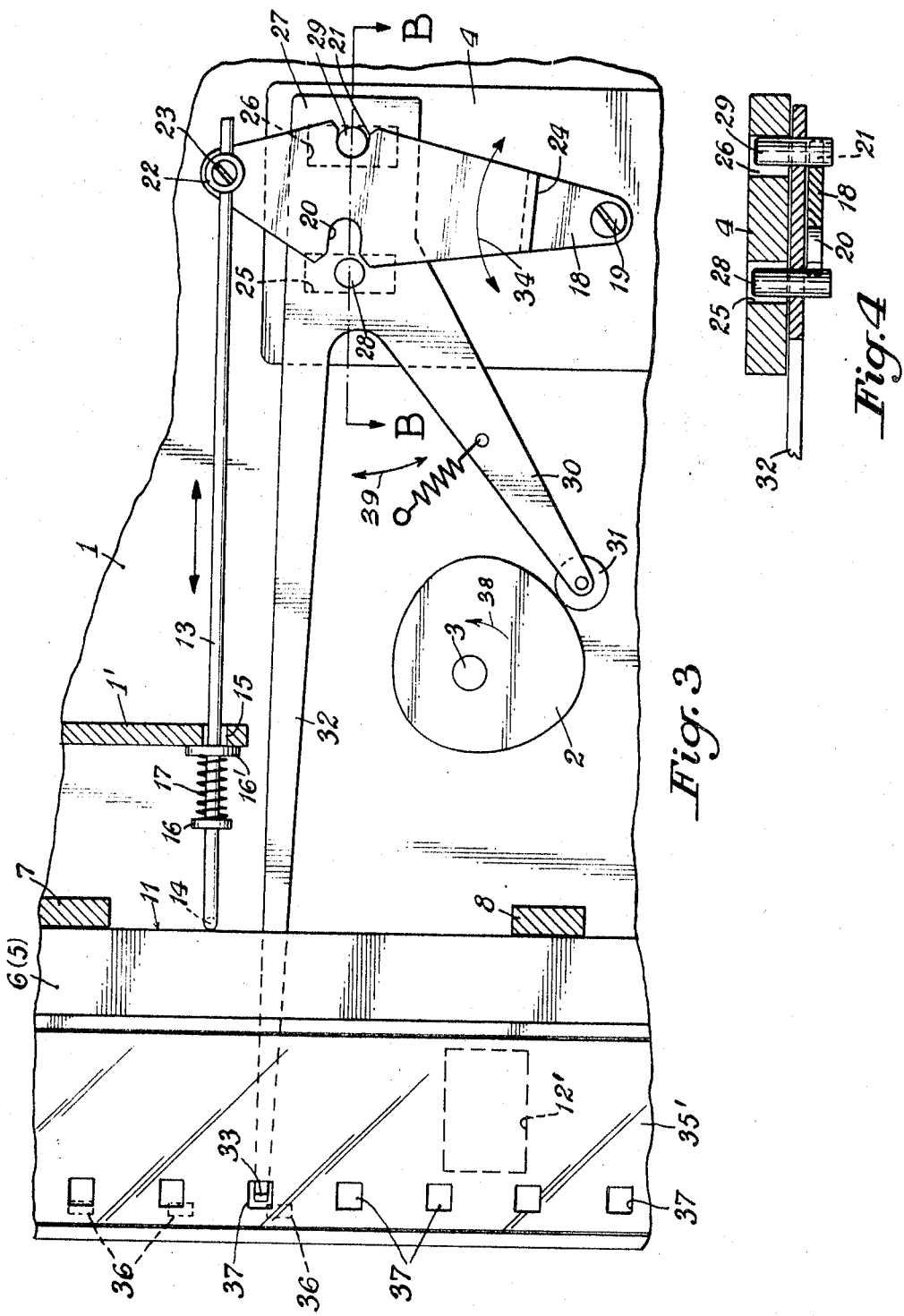

United States Patent Office 3,460,730
Patented Aug. 12, 1969

3,460,730
FILM ADVANCING DEVICE
Fritz Krumbein, Stuttgart-Mohringen, Germany, assignor to Zeiss Ikon Aktiengesellschaft, Stuttgart, Germany, a corporation of Germany
Filed June 13, 1967, Ser. No. 645,828
Claims priority, application Germany, July 1, 1966, Z 12,311
Int. Cl. G03b 1/22, 41/00
U.S. Cl. 226—64      10 Claims

ABSTRACT OF THE DISCLOSURE

The film advancing device is intended for use in photographic apparatuses, such as motion picture cameras and projectors and is provided with a pivotally mounted film gripper whose feeding stroke is controlled by a driven cam and also with a displaceable gripper bearing which permits the selective employment of two films whose perforations are differently spaced from each other and also are arranged at different laterally offset relations with respect to the picture window.

---

The invention relates to a film advancing device in photographic cameras and projectors in which a film gripping member by means of changes in the gripping member operating mechanism is adapted for advancing of films provided with differently spaced perforations.

Known devices of this kind operate with a crank-type gripper, the crank pin of which is secured to a carriage which is radially displaceable relative to the drive shaft or which operates the gripper by way of an intermediary member whose bearing is adjustable.

In all these constructions the gripper is disposed adjacent the picture window in the direction of movement of the film.

However, the prior art devices require rather complex means for adjusting the gripper stroke. They are therefore expensive and not at all safe against an accidental adjustment during operation. Furthermore, they depend on the use of a crank as a drive means which affords no ideal course of motion for the step by step film advance. Also, the feed ratio attainable with a crank drive is so unfavorable, particularly for motion picture projectors, that this type of drive is hardly used any more today. When the various kinds of perforations differ from each other in their advancing step in addition to their relative position to the picture window, then the prior art solutions fail completely.

For these reasons, two separate grippers have lately been used for advancing two films having different perforations. One of these grippers is always inoperative at a time.

This solution is possibly even more awkward than the previously described ones, the more so, since also here control means are necessary for turning the two grippers on and off and for putting them into an operative position or disengaging them therefrom respectively.

The invention has as its object the creation of a simple, adjustable film advancing device which satisfies the functional requirements by a mere change of the film advancing step, i.e. the gripper stroke, with a minimum of means.

According to the invention, this problem is solved by means of a film advancing device in which the gripper bearing is adjustable relatively to the gripper.

Another object of the invention is a simple, adjustable film advancing device which satisfies the functional requirements also in the event the different perforations vary from each other in addition to their spacing also in their relative position to the picture window. This is accomplished according to the invention in that the bearing of the film advancing device is made adjustable relatively to the gripper for the purpose of changing the gripper stroke, and is additionally adjustable together with the gripper for the purpose of adapting the point of engagement between the gripper and the perforation to the changed position of the perforation relative to the picture window occasioned by a change of film.

According to another feature of the invention, the displacement of the gripper bearing and also an additional displacement of the gripper is effected by a scanning device which scans control surfaces of exchangeable film guides. Preferably, both adjustments are made in one single operation.

In order to achieve a definite positioning of the gripper in any operative position and to assure the smallest possible scanning path for the scanning device, according to the invention the displacement of the gripper bearing for the purpose of changing the length of the stroke is accomplished by means of two stationary members of the bearing, i.e. the bore or the pivot pin, which alternately form parts of the pivot bearing for the gripper.

For changing from one to the other point of the bearing serve a stationary and a movable bearing member when pivot pins are used which are stationary in the bearing. This stationary member and the movable bearing member are provided each with two recesses for receiving the pivot pins and each pair of these recesses form a pivot bearing for one of the pivot pins. The movable bearing member may be pivotally mounted on the stationary bearing member. According to the invention, the movable bearing member may also be movable perpendicular to the longitudinal axis of the pivot pin and may have open recesses toward the pivot pins. The movable bearing member may be arranged between the pivot pins of the gripper or it may frame-like encompass these pivot pins.

For the additional adjustment required when the location of the perforation relative to the picture window has changed, it is merely necessary to so space the recesses in the stationary bearing member that the walls of these recesses form a stop for the pivot pin, to which the gripper bearing is to be switched, only after an excess stroke for the additional correction is completed or the additional screening path has been traversed. During this excess stroke or the screening path, respectively, the gripper including its two pivot pins is taken along, while during the adjustment of the gripper stroke the gripper with its two pivot pins remain unchanged in their position.

It is further within the scope of the invention to displace the gripper bearing by providing bearings or pivot pins, respectively, for causing the gripper to make a pivotal movement in order to engage one or the other pivot pin or one or the other diameter of the bearing, respectively, whereby said bearings or pivot pins, respectively, are movable at least approximately in the direction of the pivot axis of the gripper.

The scanner according to the invention may be a wire rod which is connected to the movable bearing member or members, respectively, by a clamping device and by the action of a spring is urged against the control surface of the film guide inserted at the particular time.

Finally, according to the invention the gripper may be placed between the stationary and the movable bearing member so that the gripper is additionally laterally guided by these members.

In the following the invention will be described in further detail with reference to the accompanying drawing from which features non-essential to the invention have been omitted for clarity's sake.

In the drawings:

FIG. 3 is a partial sectional view similar to FIG. 1 but with the gripper adjusted to advance a film having differently spaced perforations; and FIG. 4 is a section along the line B—B of FIG. 3.

Figure 1:
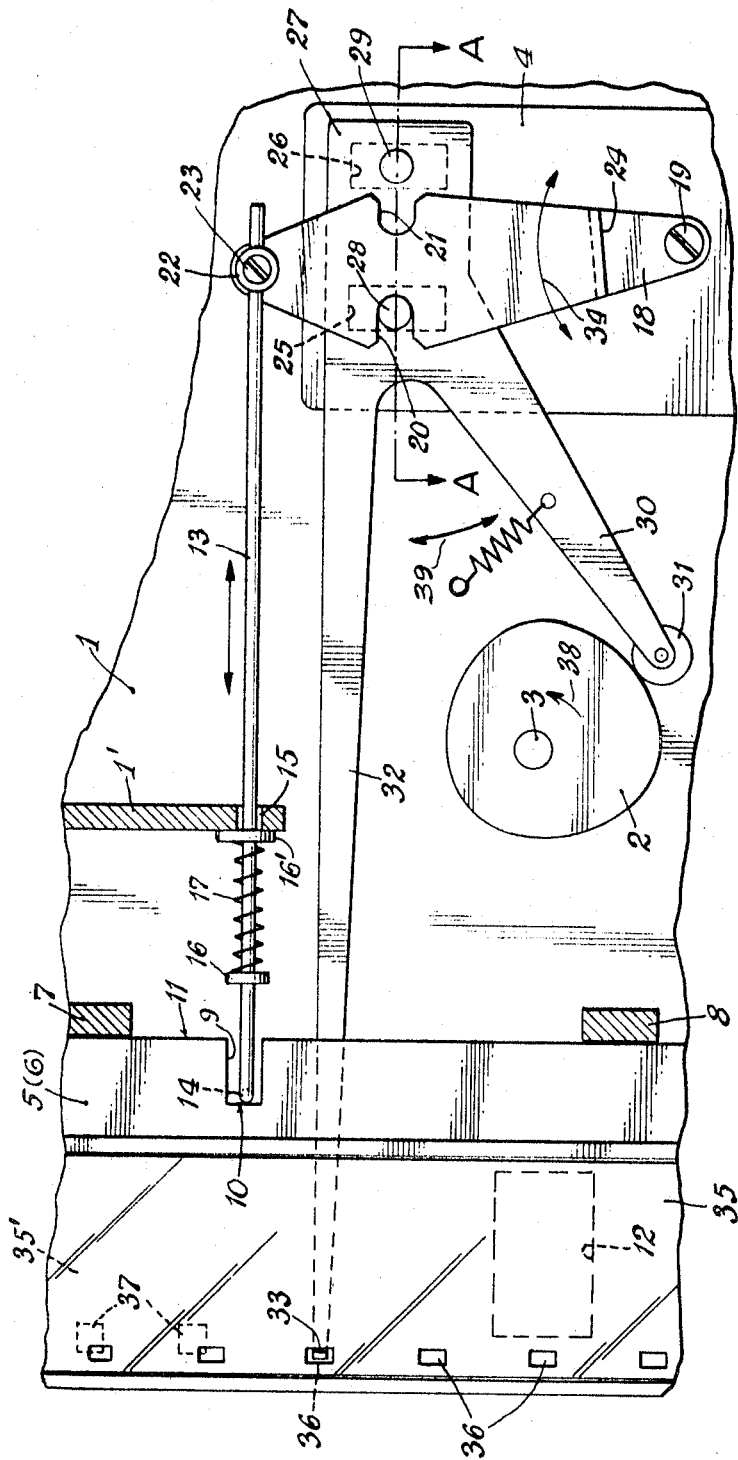
FIG. 1 is a partial sectional view of a motion picture apparatus provided with a gripper according to the invention.

Referring to FIG. 1, the housing 1 of a motion picture apparatus has arranged therein a gripper control cam 2 monuted on a transversely extending drive shaft 3 and a stationary bearing plate 4. The housing 1 also contains selectively employable, exchangable vertically disposed film guides 5 and 6 the stops 7 and 8 which determine the lateral position of the film guides 5 and 6. The exchangeable film guide 5 is provided with a recess 9 having a control surface 10, while for the exchangeable film guide 6 the vertical edge 11 serves as a control surface. With 12 is designated the picture window. The control surface 10 of the film guide 5 or the control surface 11 of the film guide 6, respectively, are engaged by a scanner member 13 in the form of a rod and having a bent-off end 14. The scanner rod 13 extends freely through an aperture 15 in a housing wall 1' and carries fixedly thereon a washer 16. A compression spring 17 on the scanner 13 engages the washer 16 with one of its ends and with its other end engages a washer 16' on the wall 1' of the housing 1.

The stationary bearing plate 4 carries a vertically disposed movable bearing portion 18 which is pivotally mounted with its lower end on a shouldered screw 19 so as to be movable about the axis of the screw 19 in a vertical plane. The movable bearing portion 18 is provided near its upper end with two oppositely arranged recesses 20 and 21. At its upper end which is opposite the shouldered screw 19 the bearing portion 18 has attached thereto a clamping device 22, 23, of which the part 22 comprises a bushing rotatable relative to the movable bearing portion 18 and having an axially extending tapped hole and a diametrically extending bore for receiving the scanner rod 13, while 23 is a clamping screw threaded into the tapped hole of the bushing 22 for securing the scanner rod 13 in position. At 24 a lower portion of the movable bearing part 18 is offset, so as to produce space between the movable bearing part 18 and the stationary bearing plate 4. The latter is provided with two rectangular apertures 25 and 26 in the region of the recesses 20 and 21 of the movable bearing portion 18.

In the space between the stationary bearing portion 4 and the movable bearing portion 18 is arranged a gripper 27 having fixedly mounted thereon two laterally spaced pivot pins 28 and 29. These pivot pins 28 and 29 project from both sides of the gripper 27 and extend into the apertures 25 and 26 of the stationary bearing plate 4 and are also adapted to alternately enter into the recesses 20 or 21 of the movable bearing portion 18.

Projecting from the gripper 27 are a short scanning arm 30 provided at its free end with a scanning roller 31 engaging the circumference of the control cam 2 and a long horizontal gripping arm 32 with a gripping tooth 33 at its free end. The bearing portion 18 is movable about the axis of the screw 19 in the directions indicated by the double arrow 34. The film 35 is provided with spaced perforations 36 or another film 35' is provided with perforations 37 which are spaced differently than the perforations 36 and also are located differently with respect to the picture window 12. The gripper 27 is pivotally movable in the direction of the double arrow 39 and in a plane extending parallel to the plane of the film 35 and the picture window 12.

Figure 2:
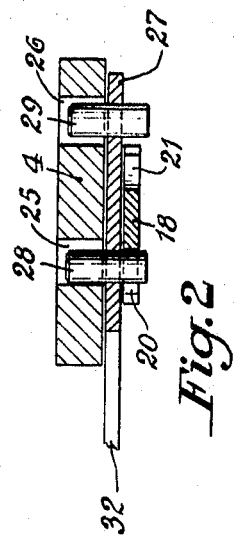
FIG. 2 is a sectional view along the line A—A of FIG. 1.

In the operative position of the device illustrated in FIGS. 1 and 2, the film guide 5 for a film 35 with perforations 36 has been inserted. The bent end 14 of the scanner rod 13 engages the control surface 10 under the action of the compression spring 17. The movable bearing portion 18 has been pivoted by the scanner 13 by way of the clamping device 22, 23, so as to engage the pivot pin 28. This pivot pin 28 is encompassed by the recess 20 in the movable bearing portion 18 and is urged against the vertical left-hand boundary edge of the aperture 25 in the stationary bearing portion 4. Thereby the pivot pin 28 has become the pivot axis for the gripper 27, the gripping tooth 33 of which engages the perforation 36 so as to advance the film when the cam 2 is rotated in the direction of the arrow 38.

In order to adjust the apparatus to the use of another film 35' having the differently spaced and differently located perforations 37 and a differently sized picture window 12', the film guide 5 is replaced by the film guide 6, as illustrated in FIGS. 3 and 4. Now the edge 11 of the film guide 6 urges the scanner 13 into its other right-hand terminal position. During this movement the movable bearing portion 18 swings away from the pivot pin 28 and engages the other pivot pin 29. The recess 21 of the movable bearing portion 18 encompasses the 21 of the movable bearng portion 18 encompasses the pivot pin 29 while the recess 20 releases the pivot pin 28. The position of the gripper 27 remains unchanged until the inner wall of the recess 21 touches the pivot pin 29. Then the relocation of the gripper producing a change in stroke of the gripper 27 is completed. During the further movement the movable bearing portion 18 employs the pivot pin 29 and the gripper 27 pivots about the pivot pin 29 which latter engages the inner vertical right-hand wall of the aperture 26 in the stationary bearing portion 4.

Now the entire change-over is completed, and the operative condition for advancing the film 35 with the perforations 37 is established as shown in FIGS. 3 and 4.

What I claim is:

1. A film advancing device for use in photographic apparatuses, including a pivotally mounted gripper for engaging perforations in the film, a drive mechanism for said gripper, and means for adjusting said gripper for selectively engaging the perforations of films having differently spaced perforations, said means comprising a gripper bearing and means for changing the position of said bearing and thereby the film advancing stroke of said gripper, said gripper being provided with two laterally spaced pivot pins each adapted to be brought into engagement with its corresponding bearing.

2. A film advancing device according to claim 1, in which said means for changing the position of said gripper bearing comprises a scanner member engaging control surfaces provided on exchangeable film guides.

3. A film advancing device according to claim 1, in which said two laterally spaced pivot pins are adapted to selectively serve as pivot axis for said gripper.

4. A film advancing device according to claim 1, including a stationary bearing plate and a movable bearing portion, said stationary plate and said movable bearing portion each having two laterally spaced recesses for receiving said pivot pins which are fixedly mounted in laterally spaced relation on said gripper, whereby each pivot pin and its associated pair of recesses form a pivot bearing for said gripper.

5. A film advancing device according to claim 1, including a stationary bearing plate and a movable bearing portion, said stationary plate and said movable bearing portion each having two laterally spaced recesses for receiving said pivot pins which are fixedly mounted in laterally spaced relation on said gripper, whereby each pivot bearing for said gripper, said movable bearing portion being pivotally mounted on said stationary bearing plate.

6. A film advancing device according to claim 1, including a stationary bearing plate and a movable bearing portion, said stationary plate and said movable bearing portion each having two laterally spaced recesses for receiving said pivot pins which are fixedly mounted in laterally spaced relation on said gripper, whereby each pivot pin and its associated pair of recesses form a pivot bearing for said gripper, said movable bearing portion being movable perpendicular to the longitudinal axes of said pivot pins and its recesses are open toward said pivot pins ready to receive the same during the movement of the movable bearing portion.

7. A film advancing device according to claim 1, including a stationary bearing plate and a movable bearing portion, said stationary plate and said movable bearing portion each having two laterally spaced recesses for receiving said pivot pins which are fixedly mounted in laterally spaced relation on said gripper, whereby each pivot pin and its associated pair of recesses form a pivot bearing for said gripper, said gripper being arranged between said stationary bearing plate and said movable bearing portion.

8. A film advancing device according to claim 4, in which the distance between the outermost edges of said two recesses in said stationary bearing plate is greater than the distance between the outermost surfaces of said pivot pins cooperating with said edges, whereby a change of the position of said gripper relative to said respective film guide is made possible.

9. A film advancing device according to claim 4, in which the distance between the innermost edges of the two recesses in said stationary bearing plate is smaller than the distance between said two pivot pins on said gripper, whereby a change of the relative position of said gripper to said film guide is made possible.

10. A film advancing device according to claim 2, in which said scanner member comprises a wire rod which by the action of a spring is urged against the control surface of a film guide inserted at a time, said wire rod being connected by a clamping device with said movable bearing portion.

References Cited

UNITED STATES PATENTS

| | | | |
|---|---|---|---|
| 2,186,443 | 1/1940 | Becker et al. | 352—80 |
| 2,449,693 | 9/1948 | Fairbanks | 226—64 |
| 2,481,115 | 9/1949 | Heurtier | 226—64 |
| 2,793,562 | 5/1957 | Grenzig | 226—64 X |
| 2,834,249 | 5/1958 | May | 226—64 |
| 3,152,741 | 10/1964 | Jorgensen | 226—65 |

ALLEN N. KNOWLES, Primary Examiner

U.S. Cl. X.R.

352—80